INVENTOR.
BENJAMIN B. BACHMAN
BY DONALD J. MACKLIN
Leon Edelson
Attorney Jan. 25, 1949. B. B. BACHMAN ET AL 2,459,911
AUXILLIARY TRANSMISSION
Filed Oct. 18, 1945 4 Sheets-Sheet 2

INVENTOR.
BENJAMIN B. BACHMAN
DONALD J. MACKLIN
BY
Leon Edelson
Attorney Jan. 25, 1949.   B. B. BACHMAN ET AL   2,459,911
AUXILLIARY TRANSMISSION Filed Oct. 18, 1945   4 Sheets-Sheet 4

INVENTOR.
BENJAMIN B. BACHMAN
DONALD J. MACKLIN
By Leo Edelson
Attorney

Patented Jan. 25, 1949

2,459,911

UNITED STATES PATENT OFFICE 2,459,911

AUXILIARY TRANSMISSION

Benjamin B. Bachman, Philadelphia, and Donald J. Macklin, St. Davids, Pa., assignors to The Autocar Company, Ardmore, Pa., a corporation of Pennsylvania Application October 18, 1945, Serial No. 623,078

20 Claims. (Cl. 74—781)

This invention relates generally to a power transmission mechanism for use in automotive vehicles and more particularly to an improved construction of a two-speed epicyclic power transmission adapted for cooperation with the main transmission of the vehicle for securing speed changes which are supplemental to those obtainable by means of the main transmission.

Specifically, it is among the objects of the present invention to provide a type of planetary gear auxiliary transmission which is adapted to be readily associated with a conventional transmission, preferably at the driven or output end thereof, and so operated in conjunction therewith as to provide the operator with an option of two speed ranges in any available ratio that the operator may select in the conventional main transmission. Thus, by suitable choice of a gear ratio in the auxiliary transmission of the present invention, it may be employed to provide overall speed reductions which fall between the ratios normally available in the main transmission.

A further and important object of the present invention is to provide the planetary gear auxiliary transmission with a speed synchronizing gear shift mechanism which is operable for both of the available gear ratios of the transmission so as to effectively insure quick and positive engagement without clash of the gears for establishing the auxiliary transmission in either high or low gear ratio.

A distinguishing feature of the auxiliary transmission of the present invention is the provision of a sun gear sleeve rotatably journalled on a driven shaft in association with clutch and brake means splined to and axially slidable on the sleeve and selectively operable either to engage a fixed brake element whereby to hold the sun gear stationary for low speed operation of the transmission or to effect interengagement of the ring gear with the pinion gear cage of the planetary gear system for high speed operation of the transmission.

Still another important and distinguishing feature of the present construction of auxiliary transmission is the provision of a ring gear which is free to rotate even while the axially slidable clutch and brake means is locked stationary with the sun gear, this being obtained by so journalling a clutch element upon the axially slidable clutch that while it is in constant entrainment with the ring gear assembly, it may be selectively shifted into and out of engagement with the planetary gear cage.

A further object of the present invention is to provide in the auxiliary transmission a speed synchronizing clutch and brake mechanism operative for both the low and high speed gear ratios of the transmission which comprises coaxial, selective, positive clutch and brake elements in combination with friction clutch elements and cooperating checking means adapted to resist coupling of the positive clutch and brake elements until their speeds have been synchronized by the friction clutch elements.

In addition to the foregoing, it is among the objects of the present invention to provide an improved actuating mechanism for the auxiliary transmission which is simple in design and construction and which is so operatively associated with the transmission as to provide for quick and efficient changeover from one speed ratio to the other.

Other objects and advantages of the present invention will be apparent more fully hereinafter, it being understood that the said invention consists substantially in the combination, construction, location and relative arrangement of parts, all as will appear from the detailed description which follows, as shown in the accompanying drawings, and as finally pointed out in the appended claims.

In the said accompanying drawings which are illustrative of a preferred construction embodying the principles of the present invention.

It will be noted that the several figures are not drawn to any particular scale, nor are all the figures drawn to the same scale, certain of them being drawn on a somewhat larger scale than others in order to more clearly show the related parts of the transmission. However, throughout the several figures like parts are designated by similar reference numerals.

Figure 1:
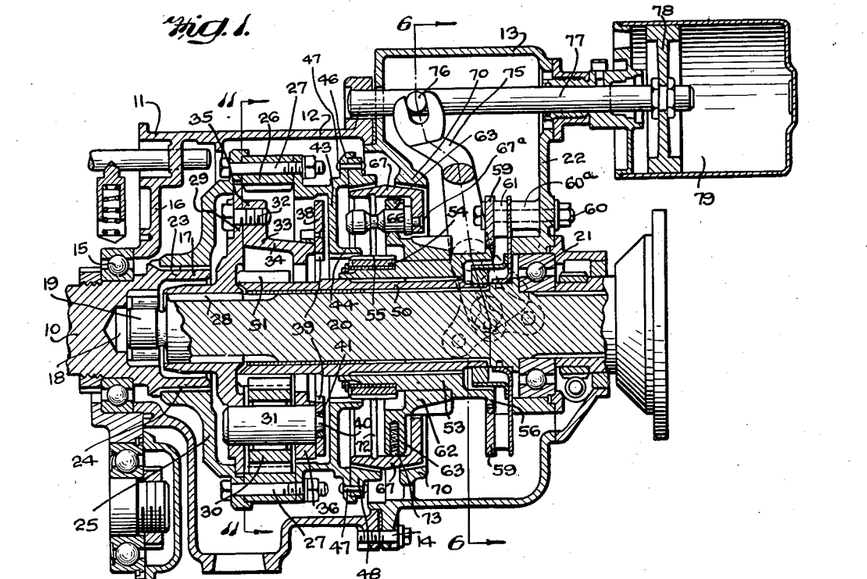
Figure 1 is a longitudinal sectional view of the auxiliary transmission showing in particular the relationship between the several parts thereof when the transmission is set for low speed operation thereof.
Figure 2:
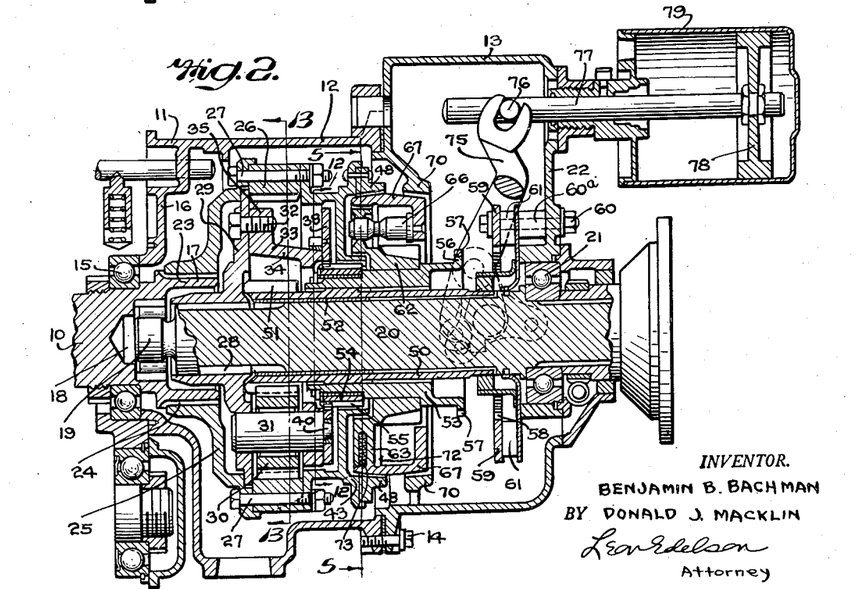
Figure 2 is a similar sectional view showing the relationship between the several parts of the transmission when it is set for high speed operation thereof.

Referring now to the drawings and more particularly to Figures 1 and 2 thereof, it will be observed that the auxiliary transmission of the present invention is designed for operative association with any conventional main transmission having a main transmission shaft 10, which operates as the drive or power input shaft for the auxiliary transmission which is suitably housed within a casing 11 consisting of a pair of main sections 12 and 13 bolted together, as by the bolts 14. Section 12 of the casing generally houses the planetary gearing of the auxiliary transmission and the speed synchronizing mechanism associated therewith, while section 13 thereof generally houses the actuating mechanism for the transmission. The drive shaft 10, which receives its power from the vehicle engine through the main conventional transmission (not shown) is ball-bearing journalled, as at 15, in the forward wall 16 of the casing section 12 with its rear end 17 extending into the casing. The rear end of the drive shaft 10 is axially recessed, as at 18, to provide a socket in which is roller-bearing journalled the reduced pilot end 19 of the power output shaft 20 of the auxiliary transmission, the rear end of this power output shaft being ball-bearing-journalled, as at 21, in the rear wall 22 of the casing section 13.

The rear end of the drive shaft 10 is radially enlarged to provide an axially extending annular part 23 arranged in embracing relation about the forward end of the driven power output shaft 20, this part having splined thereon, as at 24, a radially extending member 25 to the outer edge of which a ring gear 26 having internal gear teeth is secured by means of a plurality of circumferentially spaced bolts 27.

Figure 11:
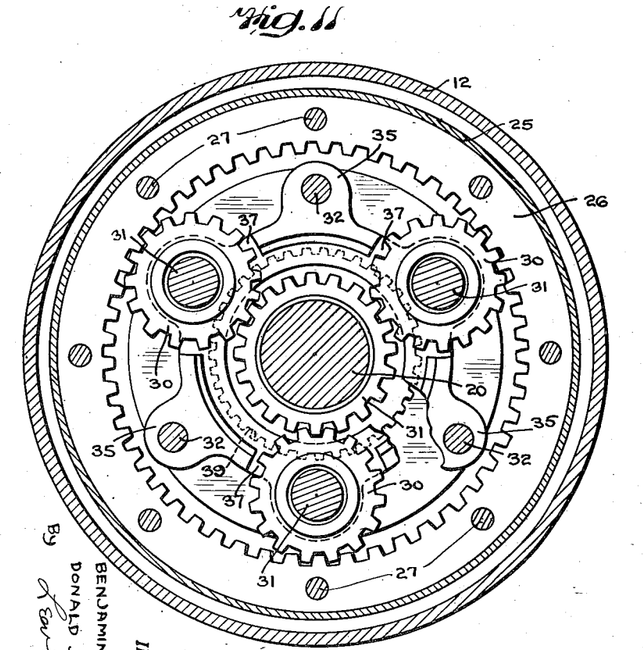
Figure 11 is a transverse sectional view taken along the line 11—11 of Figure 1.
Figure 12:
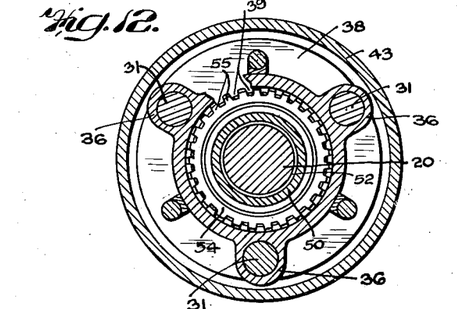
Figure 12 is a transverse sectional view taken along the line 12—12 of Figure 2.
Figure 13:
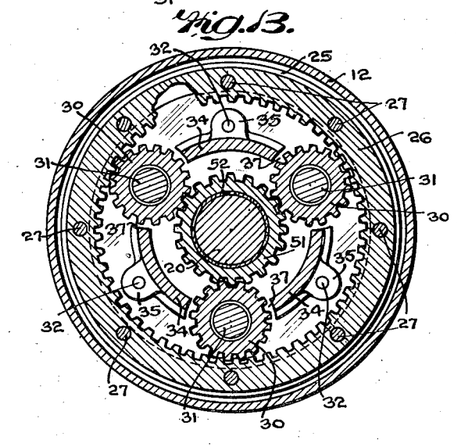
Figure 13 is a transverse sectional view taken along the line 13—13 of Figure 2.

Splined to the driven power output shaft 20, as at 28, is a radially extending member 29 constituting the forward wall of the planet gear cage in which are supported a plurality of planetary gears 30, preferably three in number spaced about the shaft 20. These planetary gears 30 are each rotatably mounted upon a shaft or spindle 31 carried by and rotatable with the planet gear cage member 29, the several planetary gears 30 being in constant mesh with the ring gear 26. Secured to the member 29, as by the bolts 32, is a second member 33 including an intermediate annular part 34 having at its forward end a plurality of bolting lugs 35 through which extend the bolts 32 and at its rear end a plurality of radially extending bosses 36 (see also Figures 11, 12 and 13) into which are respectively press-fitted the rear ends of the planetary gear spindles 31. The intermediate annular part 34 of the planet gear cage member 33 is provided with circumferentially spaced openings 37 therein through which the planetary gears 30 may freely project for meshing engagement with the surrounding ring gear 26, the bolting lugs 35 being in staggered relation with respect to the planetary gears 30.

Secured to the rear end of the planet gear cage member 33 is a radially extending annular clutch plate 38 formed with internal positive clutch elements in the form of gear teeth 39. This clutch ring 38 is rigidly fixed to the planet gear cage for rotation therewith, said clutch ring being also secured to the planetary gear spindles 31 which are provided with reduced terminal ends 40 respectively fitted in suitable holes provided therefor in the plate member 38, the terminal ends 40 of the spindles being preferably welded in place, as at 41. The clutch plate 38 is thus in effect integral with the spindles 31, so that upon rotation being imparted to the clutch plate in the manner and by the means to be described hereinafter the several spindles 31 and their associated planetary gears will be caused to move in an orbit embracing the power output shaft 20.

Also secured to the member 25, by means of the bolts 27, for rotation with the power input or driving shaft 10 and the ring gear 26 is a member 43 which serves conjointly with the member 25 and the ring gear 26 to more or less completely embrace the relatively rotatable planetary gear cage, the member 43 being provided with a rearwardly extending hub-like flange 44 which is internally provided with gear-like clutch teeth 45 adapted to be brought into axial alinement with the clutch teeth 39 of the plate 38 carried by the planetary gear cage. The member 43 is further provided at its outer edge with an annular portion 46 to which is secured, as by the bolts 47, a friction clutch element 48 having an internal conical friction clutch surface 49, this friction clutch element 48 being arranged in concentric embracing relation with respect to the positive clutch teeth 45.

Rotatably fitted upon the power output or driven shaft 20 is an elongated sleeve 50, the forward end of which is provided with an integrally formed or otherwise rigidly secured sun gear 51. Preferably, a bushing or other suitable bearing 52 is interposed between the shaft 20 and its relatively rotatable sleeve 50. Splined externally to the sleeve 50 for rotation therewith is an axially shiftable clutch member 53 upon the forward end of which is rotatably journalled a collar 54 having external gear-like clutch teeth 55. The clutch collar 54 is fixed against axial movement with respect to the member 53 and is so disposed in relation to the member 43 that its clutch teeth 55 are in constant mesh with the clutch teeth 45 of said member 43. Further, the clutch teeth 45 are of such length that when the clutch member 53 is shifted forwardly into the position shown in Figure 2 the said clutch teeth are engageable with the clutch teeth 39 of the plate 38 carried by the planetary gear cage, thereby connecting the member 43 (and the ring gear 26) to the planetary gear cage for rotation therewith. In this condition of the transmission, the drive shaft 10 and the driven shaft 20 would be directly coupled for high speed operation thereof, the drive being from the shaft 10, through the member 25, the ring gear 26, the member 43, the clutch collar 54, the clutch plate 38 and planetary gear cage members 33 and 29, to the driven or power output shaft 20. In such high speed relation of the parts (Figure 2) the ring gear 26, the sun gear 51 and the intervening planetary gears 30 are all locked together for unitary rotation.

Formed at the rear end of the axially shiftable clutch member 53 is a radially extending annular flange 56 having a series of external gear-like teeth 57 which are adapted to be axially shifted into and out of engagement with the internal teeth 58 formed in a pair of vertically spaced arcuately shaped plates 59—59 fixedly secured in position against both axial and rotative movement with respect to the shaft 20 and its associated parts. Preferably, the plates 59—59 are secured against internal bosses 60ᵃ formed on the rear wall 22 of the transmission casing by the bolts 60 and spacer elements 61 (see Fig. 6).

As appears most clearly in Figure 1, when the axially shiftable clutch member 53 is shifted rearwardly into engagement with the fixed plates 59—59, the latter holds the clutch member 53 stationary in consequence of which the sleeve 50 and the sun gear 51 are likewise held stationary, the sleeve 50 being splined to the member 53. At the same time, the clutch collar 54 and its clutch teeth 55 are disengaged from the forward clutch plate 38 while remaining in mesh with the member 43 fixedly associated with the ring gear 26. In this condition of the transmission, the driven or power output shaft 20 is free to rotate relatively to the drive or power input shaft 10, but at a reduced speed determined by the ratios of the several gears of the planetary gear system. Thus, Figure 1 illustrates the relation of the several parts of the transmission for low speed operation thereof in which the drive is transmitted from the shaft 10 to shaft 20 by way of the member 25, the ring gear 26 and the planetary gears 30 revolving about the stationary sun gear 51, thereby imparting rotation to the planetary gear cage members 33 and 29 and to the driven shaft 20.

Fixedly secured to the axially shiftable clutch member 53 is an element 62 forming part of the speed synchronizing mechanism of the transmission, this element 62 being provided with a radially extending circumferential flange 63 having a series of openings 64 formed therein spaced circumferentially 120° apart. These openings 64 are arranged with their axes extending parallel to the axis of the shaft 20, the opposite ends of each opening being countersunk to provide opposed conical entrances 65—65 therefor. Extending axially through each opening 64 is a cylindrical pin 66, the rear ends of these pins being secured, as at 67ᵃ, to the rear flange of a drum-shaped speed-synchronizing member 67 having oppositely tapered friction surfaces 68 and 69. The conical friction surface 68 is concentrically disposed within the conical friction clutch element 48 formed as a portion of the clutch member 43 carried by and rotatable with the ring gear 26, while the conical friction surface 69 is concentrically disposed within a fixed internal friction element 70 formed as an integral internal extension of the section 13 of the transmission casing. The friction drum 67 is thus floatingly supported by the pins 66 upon the annular flange 63 of the speed synchronizing mechanism and is capable of being axially urged in one direction or the other to selectively effect frictional engagement of its external conical surface 68 with the internal surface 49 of the rotatable friction clutch element 48 or of its external conical surface 69 with the internal surface of the stationary friction element 70.

Each of the supporting pins 66 for the friction drum 67 is reduced in diameter between its ends to provide a pair of axially spaced, oppositely beveled shoulders 71—71, the taper of these shoulders being substantially in correspondence, respectively, with the taper of the opposed conical entrances 65—65 to the opening 64 in which the pin is fitted. The floating drum 67 is internally formed with an annular groove 72 disposed in a transverse plane centered between the axially spaced beveled shoulders 71—71 of the several pins, this groove being adapted to receive the spring-pressed detents 73 carried by the annular flange 63 of the speed synchronizing mechanism when the axially shiftable clutch member 53 is shifted rearwardly into the position shown most clearly in Figure 3 preliminarily to interengaging the clutch elements 55 and 39 for direct or high speed operation of the transmission. These spring-pressed detents 73 project radially of the flange 63 and are preferably spaced circumferentially thereabout in alternating relation with respect to the pins 66, the function of these detents being to preliminarily shift the friction drum 67 into engagement with one or the other of the friction elements 48 or 70 (depending on the shift direction of the clutch member 53) to cause a light frictional coupling therebetween.

Figure 3:
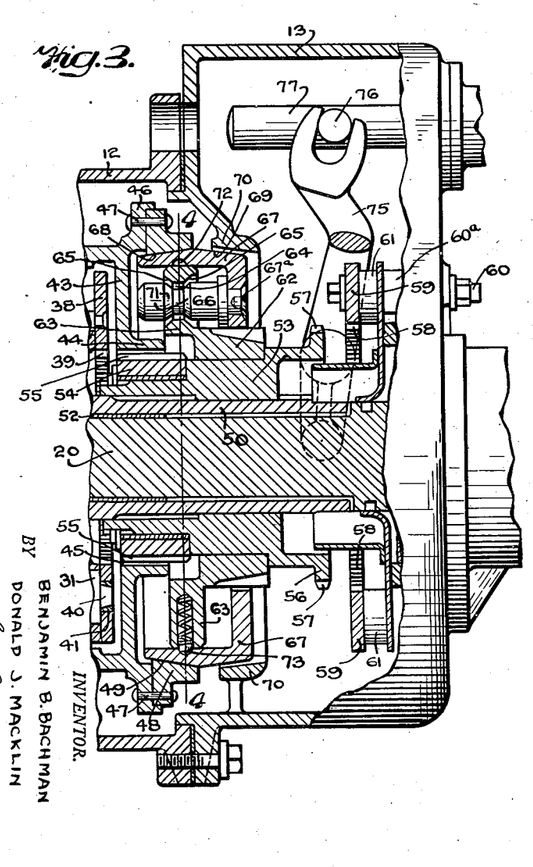
Figure 3 is an enlarged longitudinal sectional view of the rear portion of the transmission showing the relative arrangement assumed by the several parts of the transmission during the synchronizing operation prior to establishing the transmission in high or direct gear.
Figure 4:
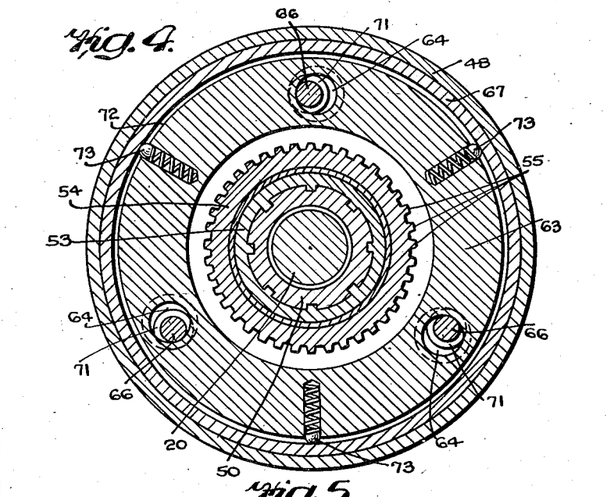
Figure 4 is a transverse sectional view taken on the line 4—4 of Figure 3.
Figure 5:
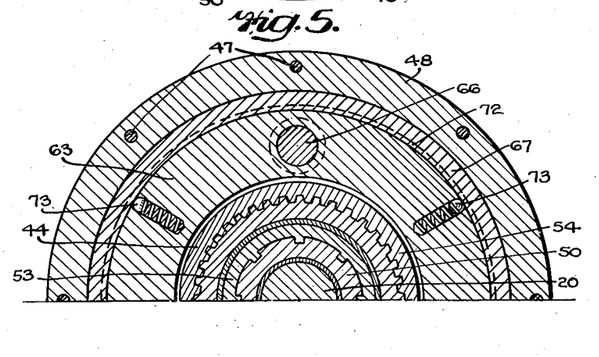
Figure 5 is a transverse sectional view of the upper half of the transmission as taken along the line 5—5 of Figure 2.

Assuming the shift of the member 53 is forwardly of the transmission, that is, from its low speed position shown in Figure 1 into its high speed position shown in Figure 2, the several spring-pressed detents 73 engage the groove 72 of the friction drum 67 to shift the latter into engagement with the friction clutch element 48 (see Figure 3). If a difference of speed exists between the members 43 and 38 sufficient to prevent quiet interengagement of the clutch collar 54 with the member 38, the drum 67, upon its frictional engagement with the member 43 rotating at the speed of the clutch collar 54, will be so angularly moved with respect to the flange 63 carried by the axially shiftable clutch member 53 that the rear tapered shoulders 71 of the several pins 66 are presented in alinement with and are engaged by the corresponding tapered sides 65 of the openings 64 through which the pins project. Continued pressure of the flange 63 against the pins 66 while the latter are so laterally offset in their respective openings 64 tends to force the friction drum 67 into increasingly greater frictional engagement with the friction clutch element 48 until eventually the speeds of members 38 and 43 become synchronized, whereupon the clutch collar 54 may be readily shifted into engagement with the member 38 to couple it to member 43 for high speed operation of the transmission, as shown in Figure 2. It will be apparent that in low speed operation of the transmission, the driven shaft 20 and the member 38 rotate at a slower speed than the drive shaft 10 and the member 43 and the clutch collar 54 and consequently to shift from low to high speed without tooth clash it becomes necessary to decrease the speed of the drive shaft 10 sufficiently to synchronize the speed of member 38 with that of the member 43.

On the other hand, in high speed operation of the transmission, as shown in Figure 2, the axially shiftable clutch member 53 and the sun gear sleeve 50 rotate as a unit with the planetary gear cage and the power output shaft 20 at the speed of the latter, with the result that when it is desired to shift into low gear (Figure 1) the speed of the member 53 is required to be reduced to zero in order to effect its engagement with the stationary plates 59—59. (Of course, such reduction in speed of the axially shiftable clutch member 53 is effected without interrupting the rotation of the power output shaft 20.)

In so shifting from high to low gear, the member 53 is shifted rearwardly to withdraw the clutch collar 54 from engagement with the clutch plate 36, the clutch collar being then engaged solely with the member 43 carried by and rotatable with the ring gear 26. As the member 53 shifts rearwardly, the conical friction surface 69 of the friction drum 67 engages the stationary friction element 70 to effect a light frictional coupling therebetween sufficient to cause the flange 63 of the synchronizer unit to shift angularly with respect to the pins 66 carried by the friction drum 67. The initial shift of the drum 67 into light frictional engagement with the stationary friction element 70 is effected by the spring-pressed detents 73 engaged in the internal groove 72 of the drum, the relative relation of the drum 67, the flange 63 and the pins 66 being as shown in Figure 3, these parts being shifted, however, as a unit to the right, i. e. rearwardly of the transmission, to present the drum 67 in frictional engagement with the stationary friction element 70.

As in the case of the shift into high gear position, continued rearward pressure of the flange 63 against the pins 66 while the latter are laterally offset in their respective openings 64 tends to force the friction drum 67 into increasingly greater frictional engagement with the stationary friction element 70 until eventually its speed and consequently the speed of the member 53 is reduced to zero, whereupon the member 53 may be readily shifted into engagement with the stationary plates 59—59 to hold the sleeve 50 and the sun gear 51 stationary for low gear operation of the transmission (Figure 1).

While any suitable mechanism may be employed for axially shifting the member 53 splined to the sun gear sleeve 50, it is preferred to employ the mechanism shown in Figures 1, 2, and 6 to 10, inclusive. Referring now more particularly to these figures, it will be observed that the shift mechanism includes a fluid-pressure-actuated shift lever 75 operatively connected at its upper end, as at 76, to a shift rod 77 connected to the piston 78 of a fluid pressure motor 79. The lever 75 is in the form of a yoke having oppositely extending curved arms 80—80 which embrace the rear end of the power output shaft 20 and its immediately associated parts of the transmission. These yoke arms 80—80 of the lever 75 are respectively journalled upon bearing studs 81—81 threaded, as at 82, into suitable bosses 83 formed in the opposite sides of the section 13 of the transmission casing, each arm 80 being provided with a part 84 extending beyond its pivot stud 81.

The freely extending part 84 of each arm 80 is provided with an opening 85 extending therethrough in which is journalled the shank 86 of a grooved shoe 87 shaped to embrace the rim of the toothed terminal flange 56 of the axially shiftable clutch member 53. The shoes 87—87 are disposed in diametrically opposed relation (see particularly Figure 6) and remain in engagement with opposite sides of the flange 56 for all positions of the shifting lever 75. As the lever 75 is shifted in one direction or the other about its pivot studs 81—81, the shoes 87—87 exert a balanced pressure against the flange 56 to correspondingly shift the member 53 axially of its supporting sleeve 50 and the power output shaft 20.

Figures 6, 7, 8, 9, 10:
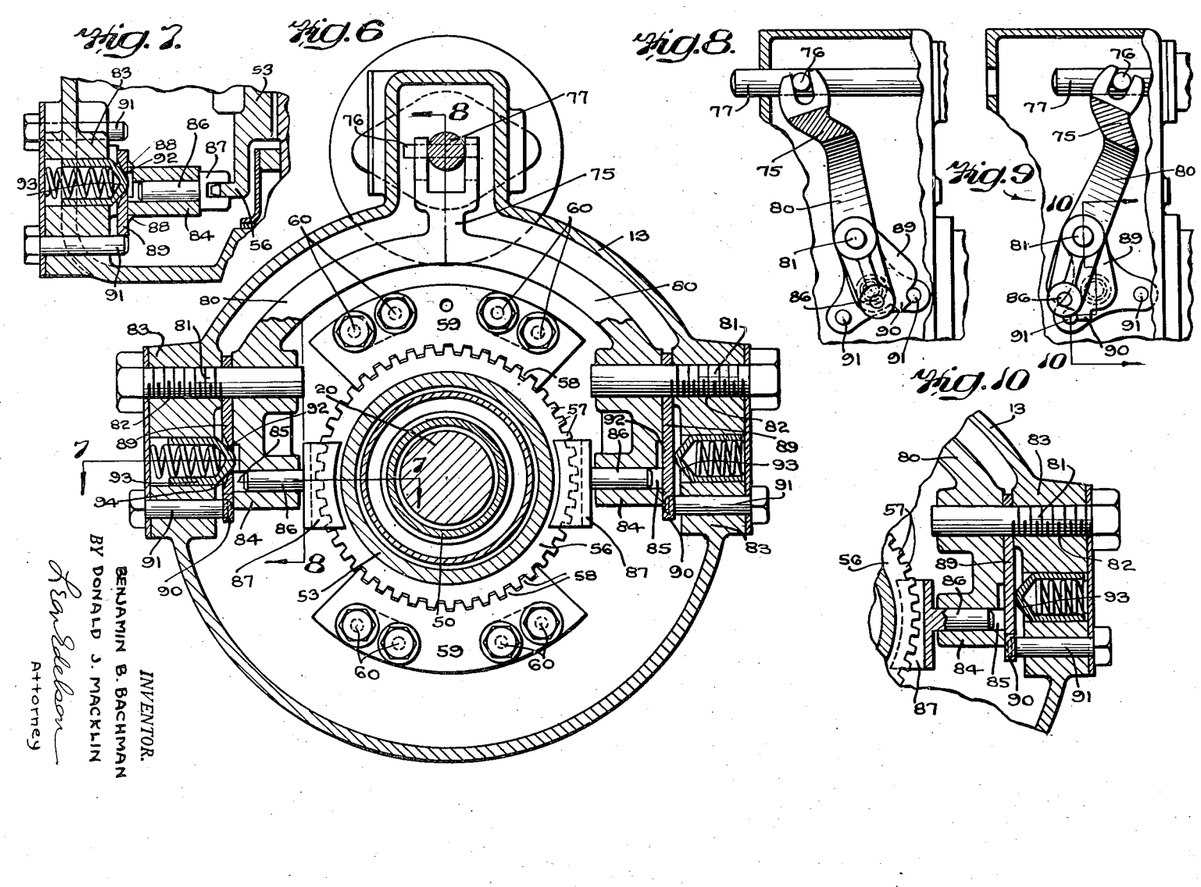
Figure 6 is a transverse sectional view taken along the line 6—6 of Figure 1.
Figure 7 is a horizontal sectional view taken on the line 7—7 of Figure 6.
Figures 8 and 9 are views taken substantially along the line 8—8 of Figure 6 respectively showing the low and high gear positions of the actuating lever for changing the gear ratios.
Figure 10 is a vertical sectional view taken substantially along the line 10—10 of Figure 9.

Secured to the outer face of each terminal portion of the yoke arms 80—80 (preferably by welding as at 88, Figure 7) is a flat detent plate 89 of the shape best shown in Figures 8 and 9, this plate being of generally triangular outline and having a central lug 90 extending from the base thereof. A pair of detent pins 91—91 are provided in each side wall of the casing immediately below each pivot stud 81, these detent pins being so disposed relatively to the detent plate 89 that as the latter shifts with its associated lever arm 80 about the pivot stud 81, the lug 90 engages one or the other of the detent pins 91—91 to limit the pivotal movement of the lever 75. Thus, when the lever 75 is swung to the left in Figure 8 for low gear setting of the transmission, the lug 90 engages the right hand detent pin 91, while when the lever is swung in opposite direction, i. e. to the right as in Figure 9, for high gear setting of the transmission, the lug 90 engages the other or left hand detent pin 91. Shifting of the lever 75 beyond the extent actually necessary to establish the desired gear ratio is thus effectually precluded.

In order to hold the gear shift lever 75 in one or the other of its two positions shown in Figures 8 and 9, each of the detent plates 89—89 is provided with an opening 92 therein for reception of a spring-pressed retainer 93 suitably disposed in each side wall boss 83 of the transmission casing. It will be observed that the detent plates 89—89 are of identical construction, the opening 92 thereof being in each case laterally offset from the longitudinal center line of the plate. In consequence of this duplicate construction of the plates 89—89, when the inner faces thereof are respectively secured to the outer faces of the terminal portions of the yoke arms 80—80 as previously described, the opening 92 of one detent plate 89 is properly located to receive the spring-pressed retainer 93 when the lever 75 is shifted into its low gear position (see Figure 8), while the opening 92 of the opposite detent plate is located to receive the opposite spring-pressed retainer when the lever 75 is shifted into its high gear position. Thus, one detent plate 89 coacts with its associated spring-pressed retainer 93 to hold the lever 75 in one operative position, while the other detent plate similarly coacts with its associated spring-pressed retainer to hold the lever in the other operative position. Preferably, the openings 92 in the detent plates are each countersunk, as at 94, to facilitate engagement and disengagement of the spring-pressed retainers with respect to their coacting detent plates.

It will be understood, of course, that the present invention is susceptible of various changes and modifications which may be made from time to time without departing from the general principles and real spirit thereof, and it is accordingly intended to claim the same broadly, as well as specifically, as indicated by the appended claims.

What is claimed as new and useful is:

1. In a planetary gear transmission for automotive vehicles, a pair of axially alined, relatively rotatable power input and output shafts, a planetary gear mechanism operatively associated with and interposed between said shafts, said mechahism including a ring gear rotatable with one of said shafts and a planetary gear cage rotatable with the other of said shafts, said ring gear and said planetary gear cage being respectively provided with axially alined clutch elements, a sun gear in constant mesh with the planetary gears and rotatably journalled upon the shaft rotatable with the planetary gear cage, and means axially shiftable with respect to said sun gear for clutching together said axially alined clutch elements.

2. In a planetary gear transmission for automotive vehicles, a pair of axially alined, relatively rotatable power input and output shafts, a planetary gear mechanism operatively associated with and interposed between said shafts, said mechanism including a ring gear rotatable with one of said shafts, a plurality of planetary gears in mesh with said ring gear and a sun gear in mesh with said planetary gears; said ring gear being rotatable with one of said shafts, said planetary gears being supported within a cage rotatable with the other of said shafts, and said sun gear being rotatable relatively to both of said shafts; said ring gear and said planetary gear cage being provided respectively with axially alined sets of clutch elements; and a clutch collar constantly entrained with one set of said clutch elements for rotation therewith and axially shiftable relatively thereto for engagement with the other set of said clutch elements whereby to clutch said sets together for unitary rotation of the planetary gear mechanism.

3. In a planetary gear transmission for automotive vehicles, a pair of axially alined, relatively rotatable power input and output shafts, a planetary gear mechanism operatively associated with and interposed between said shafts, a ring gear rotatable with one of said shafts, a sun gear concentrically disposed within said ring gear for rotation about the other of said shafts, said sun gear including a sleeve extending axially thereof, a plurality of planetary gears interposed between said ring and sun gears for meshing engagement therewith, clutching elements operatively associated with said ring gear and planetary gears and respectively rotatable therewith about the common axis of said shafts, and a clutch collar axially shiftable with respect to and rotatable about said sun gear sleeve for clutching together said clutching elements.

4. In a planetary gear transmission for automotive vehicles, a pair of axially alined, relatively rotatable power input and output shafts, a planetary gear mechanism operatively associated with and interposed between said shafts, a ring gear rotatable with one of said shafts, a sun gear concentrically disposed within said ring gear for rotation about the other of said shafts, said sun gear including a sleeve extending axially thereof, a plurality of planetary gears interposed between said ring and sun gears for meshing engagement therewith, clutching elements operatively associated with said ring gear and planetary gears and respectively rotatable therewith about the common axis of said shafts, and a clutch collar axially shiftable with respect to and rotatable about said sun gear sleeve for clutching together said clutching elements, said clutch collar being constantly in mesh with one of said clutching elements for rotation therewith.

5. In a planetary gear transmission as defined in claim 3 wherein said clutching elements are respectively provided with internal gear-like clutch teeth adapted to be brought into coaxial alinement, and wherein said clutch collar is provided with external gear-like clutch teeth for meshing engagement with said coaxially alined internal clutch teeth of the clutching elements aforesaid.

6. In a planetary gear transmission for automotive vehicles, a pair of axially alined power input and output shafts, a planetary gear mechanism operatively associated with and interposed between said shafts, said mechanism including a ring gear rotatable with the power input shaft, a sun gear rotatable about the power output shaft, intermediate planet gears in mesh with said ring and sun gears, and a planet gear carrier secured to and rotatable with the power output shaft, an annular clutch member secured to said carrier and having a series of internal clutch teeth, a second annular clutch member secured to said ring gear in spaced parallel relation to said first-mentioned clutch member, said second clutch member having a series of internal clutch teeth adapted to be brought into coaxial alinement with the corresponding teeth of the first-mentioned clutch member, and an axially shiftable clutch collar having a series of external clutch teeth constantly in mesh with the teeth of said second clutch member and adapted to be shifted into mesh with the teeth of the first-mentioned clutch member.

7. In a planetary gear transmission for automotive vehicles, a pair of axially alined power input and power output shafts, a planetary gear mechanism operatively associated with and interposed between said shafts, said mechanism including a sun gear having an axially extending sleeve rotatable about one of said shafts, a clutch member splined to said sleeve for rotation therewith and for movement axially thereof, and a clutch collar journalled on said axially shiftable clutch member and operatively associated with the other of said shafts for rotation therewith.

8. In a planetary gear transmission for automotive vehicles, a pair of axially alined power input and power output shafts, a planetary gear mechanism operatively associated with and interposed between said shafts, said mechanism including a sun gear having an axially extending sleeve rotatable about one of said shafts, a clutch member splined to said sleeve for rotation therewith and for movement axially thereof, a clutch collar journalled on said axially shiftable clutch member and operatively associated with the other of said shafts for rotation therewith, and means for holding said clutch member stationary in one of its axially adjusted positions whereby to correspondingly lock said sun gear against rotation while permitting said clutch collar to freely rotate in unison with the shaft associated therewith.

9. In a planetary gear transmission for automotive vehicles, a pair of axially alined power input and power output shafts, a planetary gear mechanism operatively associated with and interposed between said shafts, said mechanism including a sun gear having an axially extending sleeve rotatable about one of said shafts, a clutch member splined to said sleeve for rotation therewith and for movement axially thereof, a clutch collar journalled on said axially shiftable clutch member and operatively associated with the other of said shafts for rotation therewith, and means engageable by said clutch collar in one axially adjusted position of said clutch member to lock said planetary gear mechanism for unitary rotation commonly with both shafts.

10. In a planetary gear transmission for automotive vehicles, axially alined power input and output shafts, a ring gear rotatable with one of said shafts, a sun gear rotatable about the other of said shafts, a plurality of planetary gears interposed between said ring and sun gears in mesh therewith, and a clutch and brake mechanism for drivingly connecting said shafts through said meshing gears while maintaining said sun gear stationary or for directly interlocking said gears for unitary rotation with both shafts, said mechanism including opposite pairs of coaxially alined interengageable toothed elements selectively adapted to be coupled for operation of the transmission in either said gear drive or said direct drive, and opposite pairs of coaxially alined friction elements respectively associated with said pairs of interengageable toothed elements and selectively operable for engagement prior to engagement of their associated toothed elements.

11. In a planetary gear transmission for automotive vehicles, axially alined power input and output shafts, a planetary gear mechanism interposed between said shafts and including a ring gear, a plurality of planet gears meshing with said ring gear and a sun gear meshing with said planet gears, said ring gear being rotatable with one of said shafts and said sun gear being rotatable about the other of said shafts, a sleeve fixed to said sun gear and extending axially thereof, a clutch and brake member splined to said sleeve for axial shifting movement thereon having a set of toothed elements formed on one terminal end thereof, a relatively stationary set of coacting toothed elements adapted for mesh engagement with said first set of toothed elements upon axial shifting of said clutch member in a given direction, a friction element axially shiftable with said clutch and brake member, a coacting friction element axially fixed with respect to said axially shiftable friction element, and means for effecting engagement of said coacting friction clutch elements to hold said clutch and brake member against rotation preliminarily to axially shifting it in the direction aforesaid for final coupling of the coacting toothed elements.

12. In a planetary gear transmission for automotive vehicles, axially alined power input and output shafts, a planetary gear mechanism interposed between said shafts and including a ring gear, a plurality of planet gears meshing with said ring gear and a sun gear meshing with said planet gears, said ring gear being rotatable with one of said shafts and said sun gear being rotatable about the other of said shafts, a sleeve fixed to said sun gear and extending axially thereof, a clutching member splined to said sleeve for axial shifting movement thereon, a clutch collar axially fixed on and rotatable about said clutching member, a pair of axially spaced clutch members respectively rotatable with said shafts and adapted to be coupled together by said clutch collar upon axial shifting of the clutching member in a given direction, the said clutch collar being in constant engagement with one of said clutch members for rotation therewith, a pair of coaxial friction clutch elements respectively rotatable with said ring gear and with said clutching member, and means for effecting engagement of said friction clutch elements to synchronize the rotative speeds of said shafts preliminarily to axial shifting of the clutching member in the direction aforesaid for final coupling of the axially spaced clutch members by said clutch collar.

13. In a planetary gear transmission for automotive vehicles, axially alined power input and power output shafts, a planetary gear mechanism interposed between said shafts and including a ring gear, a plurality of planet gears in mesh with said ring gear and a sun gear in mesh with said planet gears, said ring gear being rotatable with one of said shafts and said sun gear being rotatable about the other of said shafts, a sleeve fixed to said sun gear and extending axially thereof, a pair of axially spaced annular clutch rings each having internal clutch teeth respectively rotatable with said shafts, an axially shiftable clutch member splined to said sleeve for rotation therewith, a clutch collar axially fixed on and rotatable about said sleeve, said clutch collar having external gear teeth constantly in mesh with the internal clutch teeth of one of said clutch rings and engageable with the internal clutch teeth of the other of said rings to lock said planetary gear mechanism for unitary rotation, and a speed synchronizing mechanism operatively associated with said clutch member including a pair of coacting friction clutch elements respectively rotatable with said ring gear and with said clutch member adapted for engagement with one another to synchronize the rotative speeds of said clutch rings prior to intercoupling thereof by said clutch collar.

14. In a planetary gear transmission of the character defined in claim 10 wherein the opposite pairs of said friction elements each include coaxial, complementally-formed internal and external conical surfaces, and wherein the external conical surfaces are formed upon an annular drum floatingly supported between the complementally-formed internal conical surfaces of the coacting friction elements.

15. In a planetary gear transmission of the character defined in claim 10 wherein said sun gear includes an axially extending sleeve which is rotatably journalled on the shaft about which said sun gear is rotatable, a clutch and brake member splined to said sleeve for axial movement thereon, a plurality of pins respectively extending through openings formed in said member, said pins being spaced circumferentially about said clutch and brake member with their axes radially spaced from and paralleling that of said member, and a braking drum having oppositely tapered conical friction surfaces, said drum being secured to said pins and floatingly supported thereby upon the clutch and brake member for limited axial movement with respect to the latter.

16. In a planetary gear transmission of the character defined in claim 10 wherein said sun gear includes an axially extending sleeve which is rotatably journalled on the shaft about which said sun gear is rotatable, a clutch and brake member splined to said sleeve for axial movement thereon, a plurality of pins respectively extending through openings formed in said member, said pins being spaced circumferentially about said clutch and brake member with their axes radially spaced from and paralleling that of said member, and a braking drum having oppositely tapered conical friction clutch surfaces, said drum being secured to said pins and floatingly supported thereby upon the clutch and brake member for limited axial movement with respect to the latter, one of said conical friction surfaces of the braking drum being engageable with an axially fixed and relatively stationary friction element and the other of said surfaces being engageable with an axially fixed friction element rotatable with said ring gear.

17. In a planetary gear transmission for automotive vehicles, axially alined power input and power output shafts, a planetary gear mechanism interposed between said shafts including a ring gear, a plurality of planet gears in mesh with said ring gear and a sun gear in mesh with said planet gears, said ring gear being keyed to one of said shafts for rotation therewith and said sun gear being journalled upon the other shaft for rotation thereabout, a sleeve extending axially of and rotatable with said sun gear, a clutch and brake member splined to and axially shiftable on said sleeve for drivingly connecting said shafts through said meshing gears while maintaining said sun gear stationary or directly by interlocking said gears for unitary rotation with both shafts, said clutch and brake member being provided at each end thereof with a set of teeth, one set being non-rotatable with respect to the clutch and brake member for meshing engagement with a coacting group of braking teeth positionally fixed with respect to said shafts and the other set being rotatable with respect to said clutch and brake member for meshing engagement commonly with axially spaced groups of clutch teeth respectively rotatable with said shafts.

18. In a planetary gear transmission of the character defined in claim 17 wherein each pair of interengageable teeth has operatively associated therewith a pair of coacting friction elements selectively operative, upon shifting the clutch and brake member in one direction or the other, to synchronize the rotative speeds of the interengageable teeth prior to actual meshing thereof.

19. In a planetary gear transmission for automotive vehicles having axially alined power input and output shafts, a planetary gear mechanism and an axially shiftable clutch and brake member for selectively establishing the transmission in low or high gear ration, an actuating yoke having laterally spaced arms respectively pivoted to fixed supports disposed at opposite sides of said clutch and brake member, said arms having portions extending freely beyond their pivotal supports for operative shifting engagement with said member without interfering with its free rotation, means for limiting the degree of permissible movement of said yoke in opposite directions about its pivotal axis, and detent means for resiliently maintaining said yoke at the limit of its permissible movement in either direction.

20. In a planetary gear transmission as defined in claim 19 wherein said detent means include a pair of duplicate plates respectively fixed to the outer faces of said portions of the yoke arms, each plate having a depending lug centered between its opposite side adges and a recess laterally offset in relation to said lug, said plates being respectively so angularly related and secured to their associated yoke arms as to locate the recess of one plate forwardly of and the recess of the opposite plate rearwardly of a transverse plane common to the pivotal axis of said yoke arms and the center lines of said depending lugs.

BENJAMIN B. BACHMAN.
DONALD J. MACKLIN.

REFERENCES CITED

The following references are of record in the file of this patent:

UNITED STATES PATENTS

| Number | Name | Date |
|---|---|---|
| 1,693,079 | Jackson | Nov. 27, 1928 |
| 1,755,804 | Barbarou | Apr. 22, 1930 |
| 2,044,660 | Alden | June 16, 1936 |
| 2,071,165 | Harper | Feb. 16, 1937 |
| 2,250,316 | Vincent | July 22, 1941 |
| 2,262,959 | Osborne | Nov. 18, 1941 |
| 2,311,209 | Carnagua | Feb. 16, 1943 |